US011628758B2

(12) United States Patent
Otsuki (10) Patent No.: US 11,628,758 B2
(45) Date of Patent: *Apr. 18, 2023

(54) TABLE FOR SEAT (71) Applicant: Honda Motor Co., Ltd., Tokyo (JP)

(72) Inventor: Jun Otsuki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/458,143

(22) Filed: Aug. 26, 2021

(65) Prior Publication Data

US 2022/0105848 A1 Apr. 7, 2022

(30) Foreign Application Priority Data

Oct. 7, 2020 (JP) .............................. JP2020-169562

(51) Int. Cl.
*B60N 3/00* (2006.01)
(52) U.S. Cl.
CPC .................................... *B60N 3/002* (2013.01)
(58) Field of Classification Search
CPC ......... A47B 31/06; B60N 3/001; B60N 3/002
USPC .............................. 108/44; 297/145, 147, 144
See application file for complete search history.

(56) References Cited

U.S. PATENT DOCUMENTS

| 2,582,703 | A | * | 1/1952 | Kirshbaum | A47C 13/00 |
| | | | | | 312/266 |
| 3,583,760 | A | * | 6/1971 | McGregor | B64D 11/0627 |
| | | | | | 297/145 |
| 4,848,244 | A | * | 7/1989 | Bennett | B60N 3/002 |
| | | | | | 16/370 |
| 5,547,248 | A | * | 8/1996 | Marechal | B60N 2/79 |
| | | | | | 297/188.17 |
| 6,012,693 | A | * | 1/2000 | Voeller | F16M 11/048 |
| | | | | | 248/920 |
| 7,121,514 | B2 | * | 10/2006 | Twyford | B60R 11/0264 |
| | | | | | 248/283.1 |
| 8,359,982 | B2 | * | 1/2013 | Lebel | A47B 3/00 |
| | | | | | 108/7 |
| 9,010,852 | B1 | * | 4/2015 | Conrad | B60R 7/00 |
| | | | | | 297/135 |
| 9,027,486 | B1 | * | 5/2015 | Berkovitz | B60N 2/793 |
| | | | | | 248/458 |
| 11,131,423 | B2 | * | 9/2021 | Anderson | F16M 11/24 |
| 2010/0243839 | A1 | * | 9/2010 | Westerink | B64D 11/0638 |
| | | | | | 248/276.1 |

(Continued)

FOREIGN PATENT DOCUMENTS

JP H10272972 A 10/1998

*Primary Examiner* — Jose V Chen
(74) *Attorney, Agent, or Firm* — Duft & Bornsen, PC (57) ABSTRACT

A table for seat provided facing a seat installed above a floor of a vehicle, including a top plate, and a leg part attached to a support portion provided below the seat to movably support the top plate from an accommodation position below the sitting portion to a use position above a sitting portion of the seat. The leg part includes a first leg part rotatably connected to the support portion, and a second leg part having a first end rotatably connected to the first leg part and a second end rotatably connected to the top plate. The table for seat further includes a biasing member disposed between the support portion and the second leg part to apply a biasing force to the second leg part from the support portion.

12 Claims, 9 Drawing Sheets

(56) References Cited

U.S. PATENT DOCUMENTS

| | | | | |
|---|---|---|---|---|
| 2011/0148156 A1* | 6/2011 | Westerink | ............... | B64D 11/06 |
| | | | | 108/134 |
| 2012/0312198 A1* | 12/2012 | Henderson | ............ | B60N 3/002 |
| | | | | 108/44 |
| 2013/0076082 A1* | 3/2013 | Herault | .............. | B64D 11/0638 |
| | | | | 297/173 |
| 2013/0284074 A1* | 10/2013 | Satterfield | ............ | A47B 13/081 |
| | | | | 108/63 |
| 2014/0300148 A1* | 10/2014 | Frost | ................. | B64D 11/0638 |
| | | | | 297/173 |
| 2016/0375810 A1* | 12/2016 | Kong | ..................... | B60N 3/002 |
| | | | | 297/145 |
| 2018/0251057 A1* | 9/2018 | Bywaters | .............. | B60N 2/793 |
| 2018/0339775 A1* | 11/2018 | Reyes | .............. | B64D 11/00153 |
| 2019/0366900 A1* | 12/2019 | Line | ........................... | B60R 7/04 |
| 2020/0023761 A1* | 1/2020 | Nishimura | ............... | A47B 9/00 |
| 2021/0146816 A1* | 5/2021 | Schanz | .................. | A47B 5/06 |
| 2022/0105849 A1* | 4/2022 | Otsuki | .................. | B60N 3/002 |

\* cited by examiner

FIG. 2A (FIRST POSITION)

FIG. 2B (SECOND POSITION)

TABLE FOR SEAT

CROSS-REFERENCE TO RELATED APPLICATION

This application is based upon and claims the benefit of priority from Japanese Patent Application No. 2020-169562 filed on Oct. 7, 2020, the content of which is incorporated herein by reference.

BACKGROUND OF THE INVENTION

Field of the Invention

This invention relates to a table for seat provided at a seat of a vehicle, etc.

Description of the Related Art

Conventionally, there has been a known apparatus in which a flat table body is accommodated in an armrest provided on a side of a seat on which an occupant sits. Such an apparatus is described, for example, in Japanese Unexamined Patent Publication No. 10-272972 (JPH10-272972A). In the apparatus described in JPH10-272972A, the table body is supported so as to be housed in the armrest and to be withdrawable from the armrest via a support rod movably supported along a guide formed in the armrest and a bracket fixed to the support rod.

However, in the apparatus described in JPH10-272972A, since the table body is accommodated in the armrest, the armrest tends to increase in the width direction, and a space limitation for an installation of the seat is large.

SUMMARY OF THE INVENTION

An aspect of the present invention is a table for seat provided facing a seat installed above a floor of a vehicle. The seat includes a sitting portion. The table for seat includes a top plate, and a leg part attached to a support portion provided below the seat to movably support the top plate from an accommodation position below the sitting portion to a use position above the sitting portion. The leg part includes a first leg part rotatably connected to the support portion, and a second leg part having a first end rotatably connected to the first leg part and a second end rotatably connected to the top plate. The table for seat further includes a biasing member disposed between the support portion and the second leg part to apply a biasing force to the second leg part from the support portion.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1A to 4B. A table for seat according to an embodiment of the present invention is applied to a variety of seats located above a floor of a vehicle, etc. Hereinafter, an example of applying the table for seat to a vehicle seat will be described.

Figure 1A:
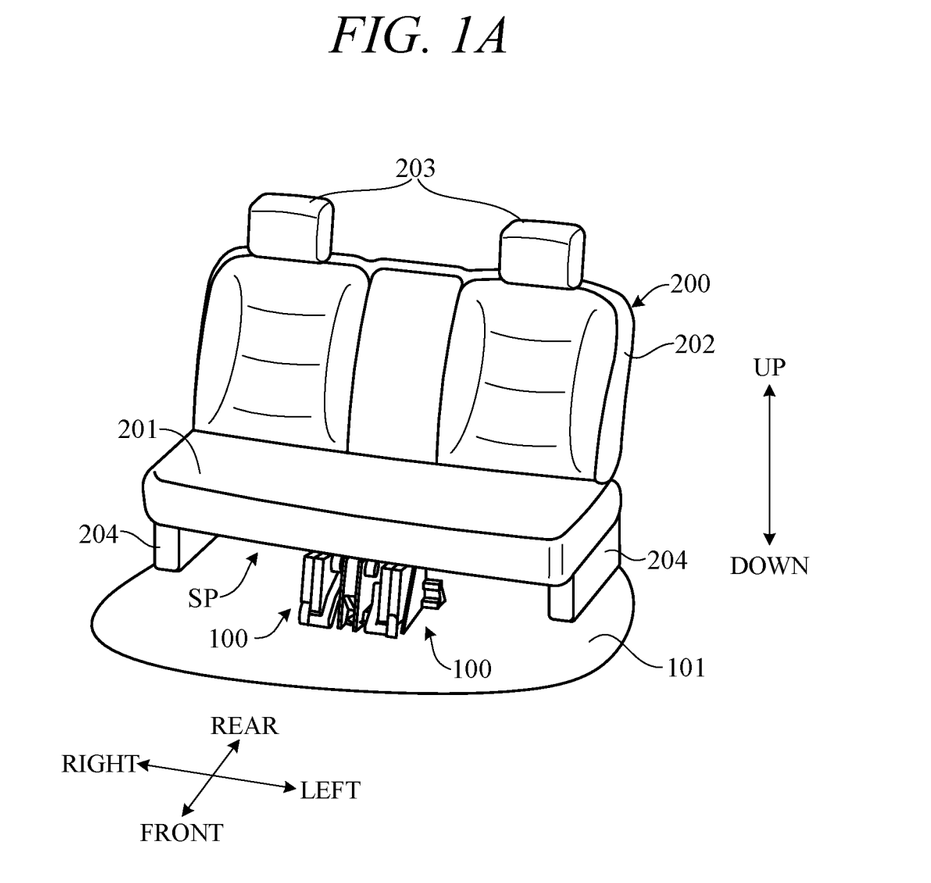
FIG. 1A is a perspective view showing an example in which a table for seat according to an embodiment of the invention is applied to a vehicle and showing a non-use state of the table for seat.
Figure 1B:
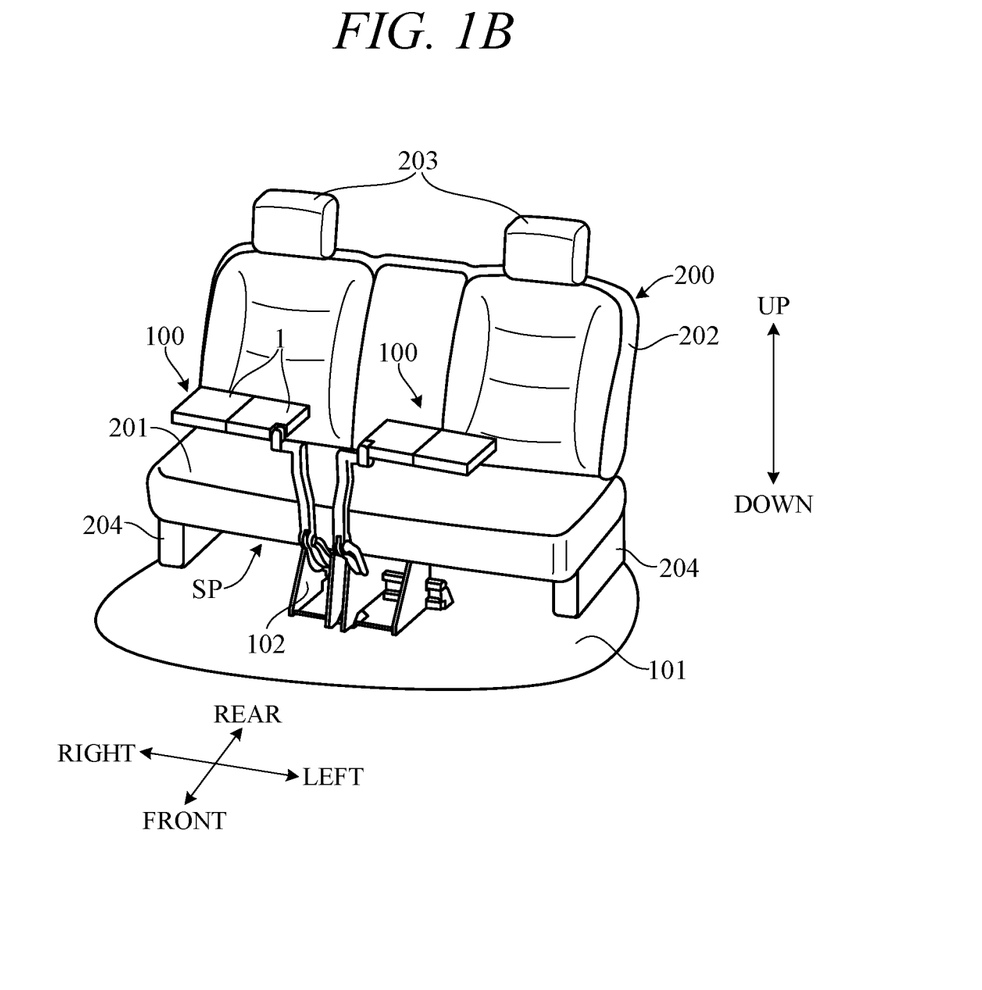
FIG. 1B is a perspective view showing an example in which a table for seat according to an embodiment of the invention is applied to a vehicle and showing a use state of the table for seat.

FIG. 1A and FIG. 1B are perspective views showing an example in which the table for seat 100 according to the embodiment of the present invention is applied to the vehicle. In particular, FIGS. 1A and 1B show an example in which the table for seat 100 is provided in the left and right rear seats of the vehicle. FIG. 1A shows a non-use state of the table for seat 100 in which the table for seat 100 is accommodated in an accommodation position, while FIG. 1B shows a use state of the table for seat 100 in which the table for seat 100 is arranged in a use position. Hereinafter, as shown in the drawing, front-rear direction, left-right direction, and up-down direction are defined, and the configuration of each part will be described in accordance with this definition. The front-rear direction, the left-right direction and the up-down direction are length direction, width direction and height direction of the vehicle, respectively.

As shown in FIG. 1A and FIG. 1B, a seat 200 is installed on a floor 101 of the vehicle. The seat 200 includes a seat cushion 201 for supporting a hip of an occupant, a seat back 202 for supporting a back of the occupant, and a headrest 203 for supporting a head of the occupant. Although not shown, an arm rest for supporting an arm of the occupant put is provided on the left and right sides of the seat 200. The seat 200 (seat cushion 201) is supported from the floor 101 via a pair of left and right legs 204 erected on the upper surface of the floor 101. Although the left and right seats 200 are integrally provided in the drawing, the left and right seats 200 may be provided separately from each other.

An accommodation space SP is formed between the floor 101 and the seat cushion 201 and between the left and right legs 204. A front of the accommodation space SP is opened. As shown in FIG. 1A, a pair of left and right tables for seat 100 in the non-use state are accommodated at the center portion of the accommodation space SP in the left-right direction. As shown in FIG. 1B, the left and right tables for seat 100 are configured symmetrically to each other corresponding to the left and right seats 200 so that the left and right occupants can be used respectively. Hereinafter, the configuration of the table for seat 100 on the right side will be mainly described.

Figure 2A:
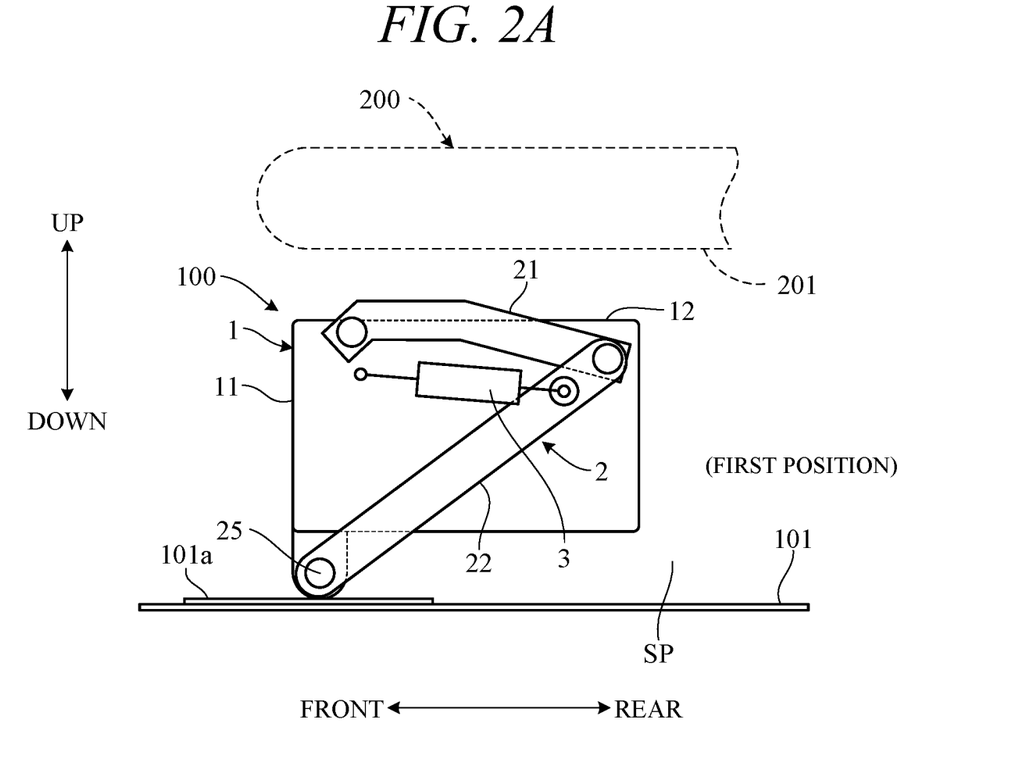
FIG. 2A is a side view showing a first position of the table for seat as an initial state when the table for seat according to the embodiment of the invention moves from an accommodation position to a use position.
Figure 2B:
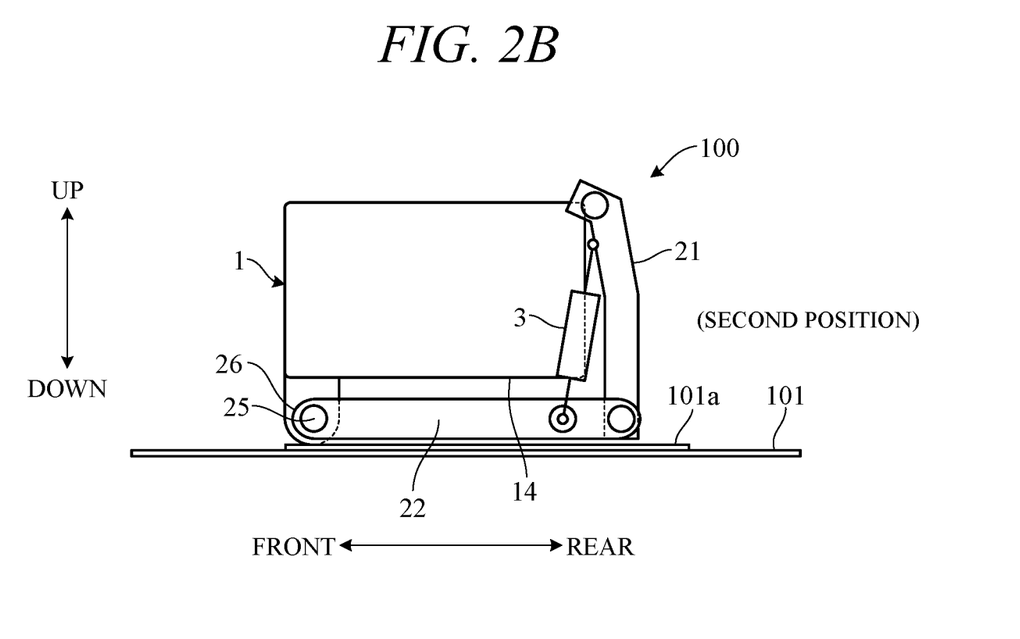
FIG. 2B is a side view showing a second position of the table for seat following FIG. 2A.
Figure 2C:
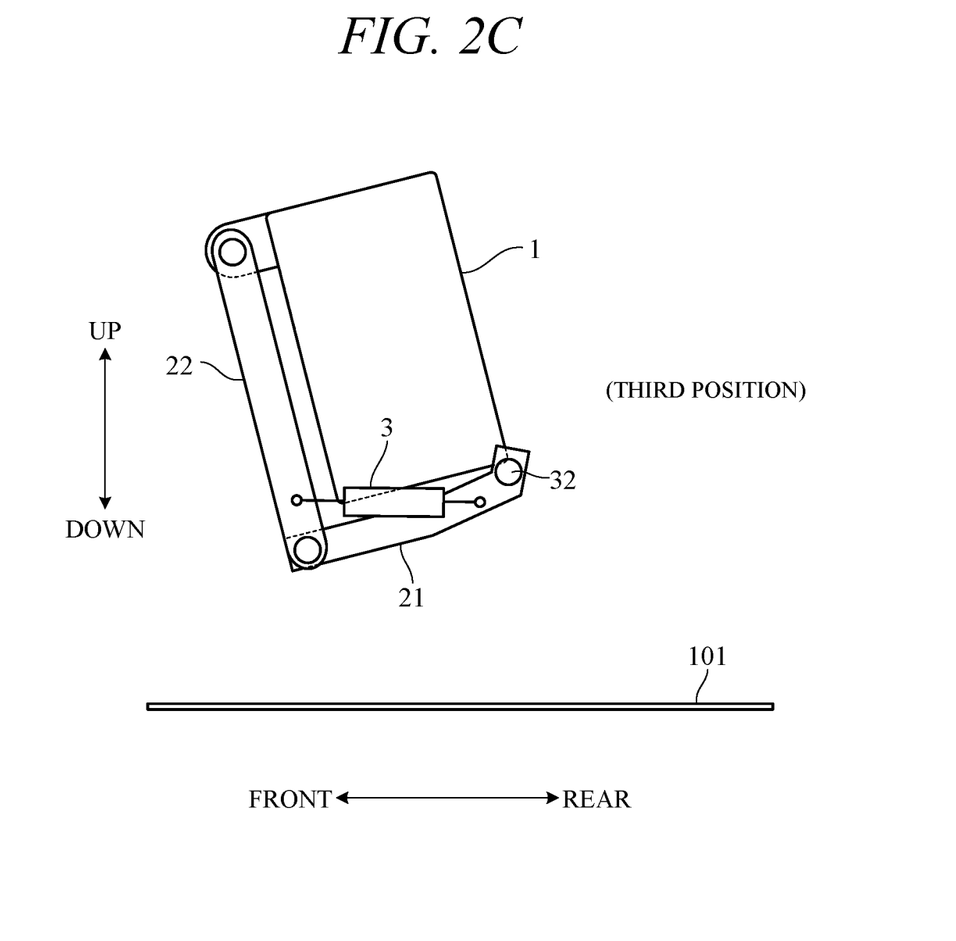
FIG. 2C is a side view showing a third position of the table for seat following FIG. 2B.
Figure 2D:
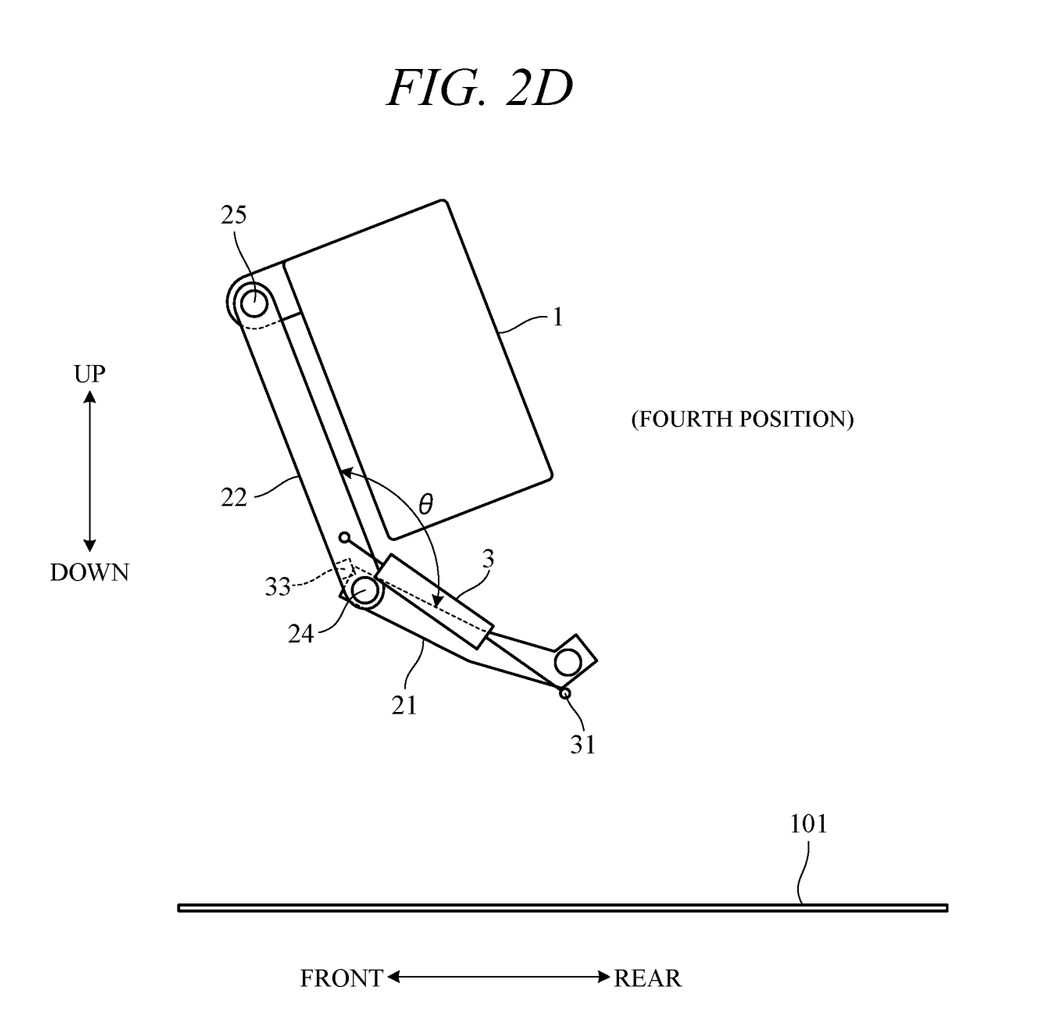
FIG. 2D is a side view showing a fourth position of the table for seat following FIG. 2C.
Figure 2E:
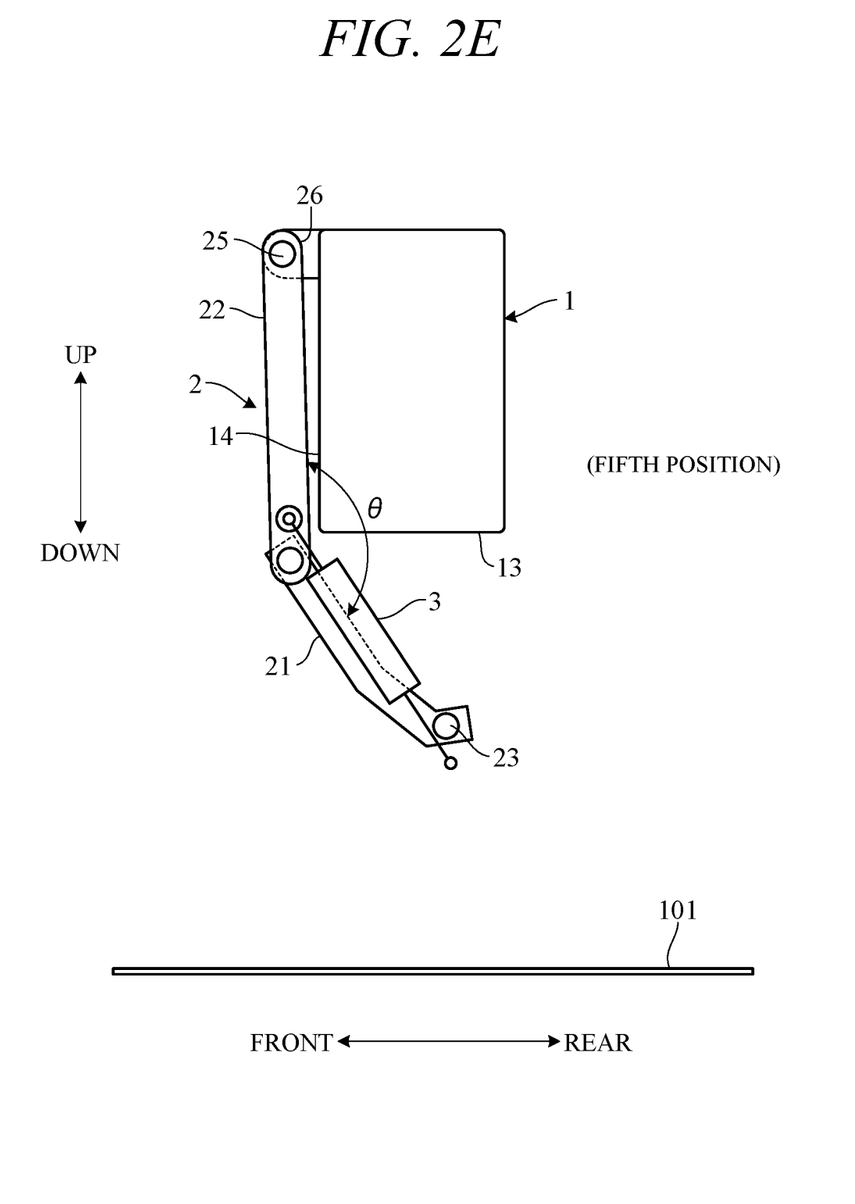
FIG. 2E is a side view showing a fifth position of the table for seat following FIG. 2D.
Figure 2F:
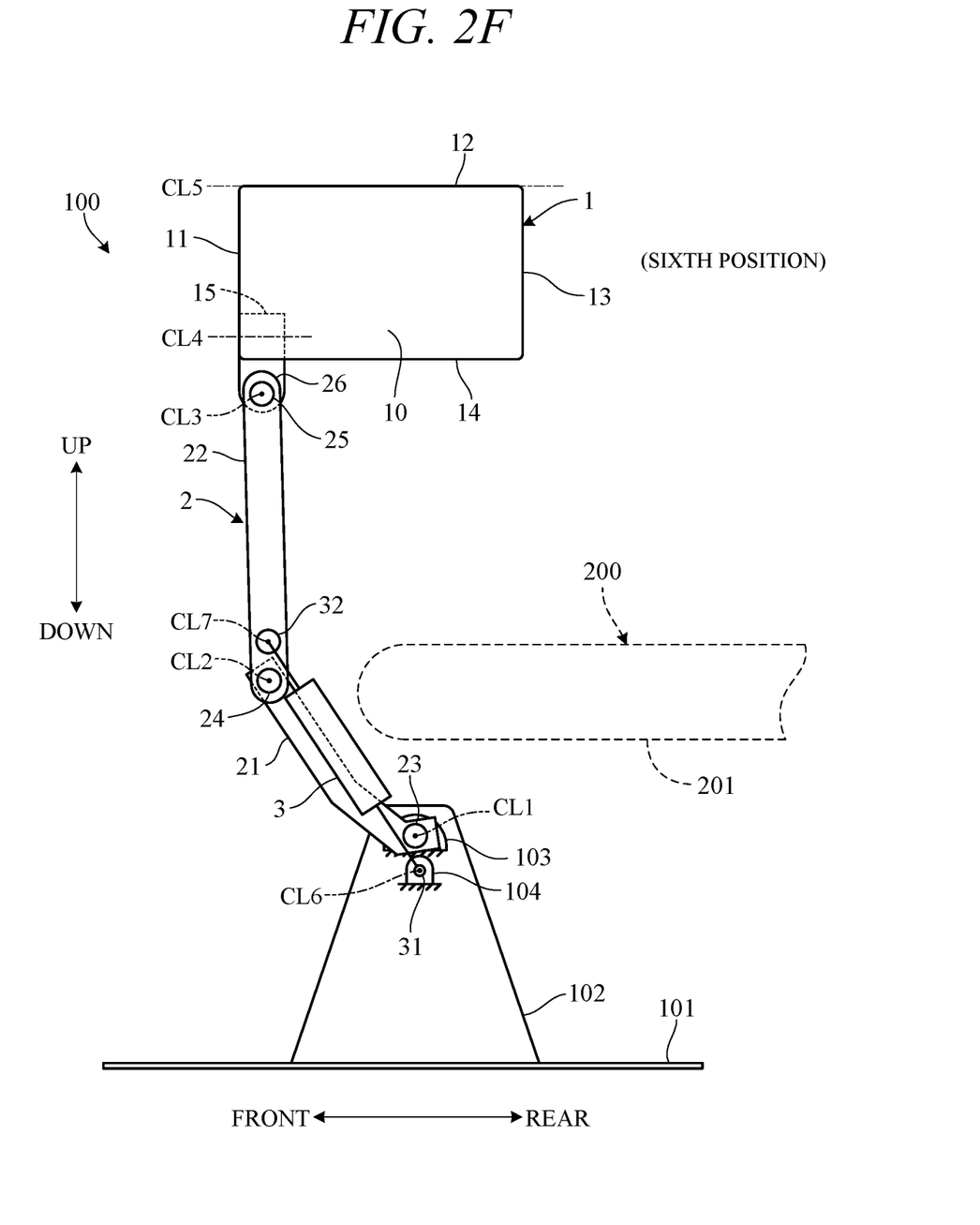
FIG. 2F is a side view showing a sixth position of the table for seat following FIG. 2E.

FIG. 2A to FIG. 2F are side views showing examples of posture changes of the table for seat 100 when the table for seat 100 moves from the accommodation position to the use position. The positions of the table for seat 100 of FIG. 2A to FIG. 2F, for convenience, referred to as a first position, a second position, a third position, a fourth position, a fifth position and a sixth position, respectively. The first position corresponds to the accommodation position (FIG. 1A). The sixth position is the position immediately before the top plate 1 reaches the use position (FIG. 1B). In FIG. 2A and FIG. 2F, a portion of the seat 200 is shown by a dotted line, further in FIG. 2F, the configuration of a support portion of the table for seat 100 is shown schematically.

As shown in FIG. 2F, the table for seat 100 includes a substantially rectangular top plate 1, and a leg member 2 for movably supporting the top plate 1 from the accommodation position below the seat cushion 201 to the use position above the seat cushion 201. The leg member 2 has a first leg member 21 and a second leg member 22 which are formed in a substantially plate-like shape and in an elongated shape. A bracket 102 is fixed to the floor 101 below a seat cushion 201. The base end portion of the first leg member 21 is rotatably supported at the support portion 103 provided in the bracket 102, via a shaft portion 23 extending along an axial line CL1 in the left-right direction.

An end of the second leg member 22 is rotatably supported at the distal end portion of the first leg member 21, via a shaft portion 24 extending along an axial line CL2 in the left-right direction. The corner portion of the top plate 1 (front lower end in FIG. 2F) is rotatably supported at another end of the second leg member 22, via a shaft portion 25 extending along an axial line CL3 in the left-right direction. Top plate 1 includes a flat surface 10 forming a mounting surface or an opposite surface of the mounting surface, and four side surfaces surrounding the flat surface 10 (a first side surface 11, a second side surface 12, a third side surface 13 and a fourth side surface 14). As shown in FIG. 2F, when the top plate 1 is positioned at the sixth position, the first side surface 11 faces forward, the second side surface 12 faces upward, the third side surface 13 faces rearward, the fourth side surface 14 faces downward, and the flat surface 10 faces rightward or leftward. That is, the top plate 1 is a vertical posture extending along the vertical plane.

A rotation holding portion 26 for holding a rotation angle of the top plate 1 with respect to the second leg member 22 at a predetermined angle (0° or 90°) is provided at the shaft portion 25. When the rotation angle is 0°, as shown in FIG. 2E, the second leg member 22 and the fourth side surface 14 is substantially parallel and the top plate 1 is accommodated in the leg member 2. When the rotation angle is 90°, as shown in FIG. 2F, the second leg member 22 and the fourth side surface 14 are perpendicular to each other and the top plate 1 is projected from the leg member 2.

Figure 3:
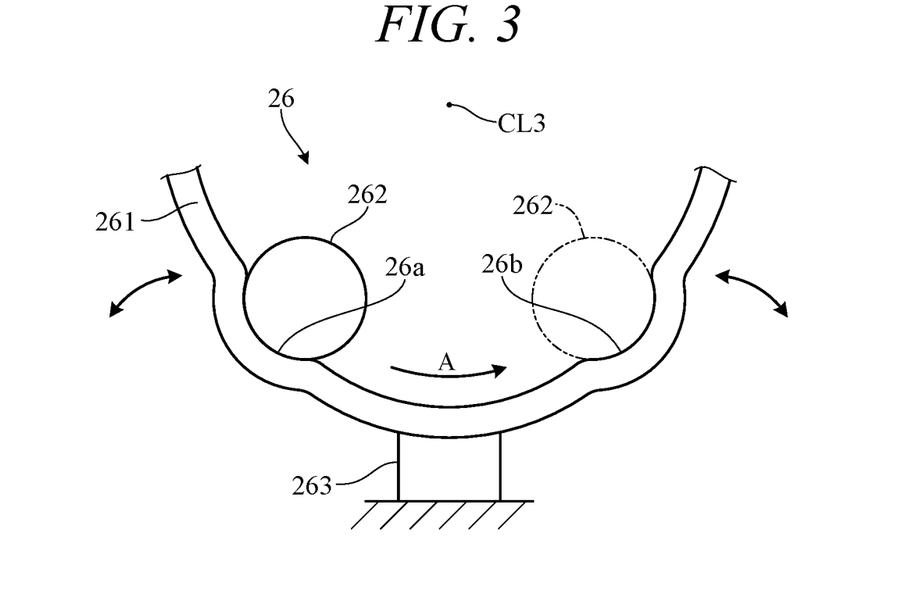
FIG. 3 is a diagram schematically showing a main configuration of a rotation holding portion for holding a rotation angle of a top plate relative to a second leg member of the table for seat according to the embodiment of the invention to a predetermined angle.

FIG. 3 is a diagram schematically showing an example of the rotation holding portion 26. As shown in FIG. 3, the rotation holding portion 26 includes a leaf spring 261 having recesses 26a and 26b corresponding to predetermined rotation angles (0° and 90°) and a pin 262 engaging with the recess 26a or 26b. The leaf spring 261 is attached to the second leg member 22, for example, via a support portion 263. The pin 262 is provided integrally with the top plate 1. The leaf spring 261 is swingable in an arrow direction with the support portion 263 as a fulcrum. When the pin 262 is engaged with the recess 26a (solid line), the rotation angle of the top plate 1 with respect to the second leg member 22 is held at 0°. On the other hand, when the pin 262 is engaged with the recess 26b (two-dot chain line) by a relative movement of the pin 262 with respect to the leaf spring 261 as shown by arrow A, the rotation angle is held at 90°. The pin 262 is relatively movable beyond the recess 26a and 26b of the leaf spring 261, thereby the rotation angle can be made smaller than for example 0° (see FIG. 2A). Although the rotation angle is set to 90° in this example, the rotation angle may be appropriately set according to the angle of the leg member 2.

As shown in FIG. 2F, the top plate 1 includes a base portion and a plate portion. A support portion 15 is provided at the base portion of the top plate 1, i.e. the intersection of the first side surface 11 and the fourth side surface 14. The top plate 1 (plate portion) is supported rotatably in the left-right direction about an axial line CL4 extending (in the front-rear direction of FIG. 2F) in parallel with an line perpendicular to the axial line CL3 by the support portion 15. A stopper (not shown) is provided at the support portion 15 so as to limit the rotation to the right of the top plate 1 about the axial line CL4. The rotation angle of the top plate 1 is limited to 90° by the stopper, thereby the position of the top plate 1 becomes the use position, and the top plate 1 is held in a horizontal posture in which the flat surface 10 faces upward.

Further, a hinge (not shown) extending along an axial line CL5 in the front-rear direction is provided at the second side surface 12 of the top plate 1. In the state of FIG. 2F, the top plate 1 is folded through the hinge. When the top plate 1 is rotated to the horizontal posture about the axial line CL4, the top plate 1 is superimposed vertically through the hinge. When the upper top plate 1 is rotated to the right through the hinge from this state, the top plate 1 is deployed to the left and right as shown in FIG. 1B. Thus, the position of the top plate 1 becomes the use position in which the top plate 1 is deployed, and two surfaces which are in contact with each other in folding state of the top plate 1 becomes mounting surfaces. The rotation angle of the top plate 1 about the hinge is limited by a stopper (not shown).

As shown in FIG. 2F, the telescopic biasing member 3 is disposed between the bracket 102 and the second leg member 22. More specifically, the bracket 102 is provided with a support portion 104 below the support portion 103, and an end portion of the biasing member 3 is rotatably supported at the support portion 104 via a shaft portion 31 extending along an axial line CL6 in the left-right direction. The other end of the biasing member 3 is rotatably supported at the second leg member 22 (between the shaft portion 24 and the shaft portion 25), via the shaft portion 32 extending along an axial line CL7 in the left-right direction and provided in the vicinity of the shaft portion 24. The biasing member 3 is, for example, configured by an air spring that constantly exerts a biasing force in the extending direction against the compressive force.

The table for seat 100 is moved from the accommodation position (FIG. 1A) to the use position (FIG. 1B) in the following manner. As shown in FIG. 2A, in an initial situation where the top plate 1 is accommodated, the second leg member 22 is biased rearward by the biasing member 3 supported by the support portion 104 (FIG. 2F), and the end portion (shaft portion 25) of the second leg member 22 is pressed against the upper surface of the floor 101, more strictly, against the upper surface of the mat 101*a* placed on the floor 101. Therefore, the base portion of the top plate 1, i.e. the end portion of the second leg member 22 is located at the lowermost portion.

In this state, the entire table for seat 100 including the top plate 1 and the leg member 2 is disposed in the accommodation space SP below the seat cushion 201 and behind the front end portions of the seat cushion 201. That is, when the table for seat 100 is not used, the table for seat 100 is accommodated in the surplus space below the seat cushion 201. At this time, the rotation angle of the top plate 1 with respect to the second leg member 22 is smaller than 0°, and the posture of the top plate 1 is a vertical posture where the second side surface 12 faces upward. Therefore, the top plate 1 of the substantially rectangular shape can be accommodated efficiently in the accommodation space SP of the substantially rectangular shape in the side view. In other words, it is possible to efficiently arrange the table for seat 100 in a space under the seat cushion 201 that is easily operated by the occupant, without narrowing the space under the feet of the occupant.

Next, the occupant grasps, for example, the upper end corner portion of the top plate 1, that is, the intersection portion of the first side surface 11 and the second side surface 12, and pulls out the top plate 1 forward. At this time, the first leg member 21 is rotated forward while the biasing member 3 is compressed, and the end portion of the second leg member 22 (shaft portion 25) moves forward while sliding on the mat 101*a*. As a result, as shown in FIG. 2B, the top plate 1 is brought to the second position in which the top plate 1 is pulled out forward of the seat cushions 201. In the second position, the fourth side surface 14 of the top plate 1 is substantially parallel to the second leg member 22, the rotation angle of the top plate 1 with respect to the second leg member 22 is held at 0° (a first rotation angle) by the rotation holding portion 26, the first leg member 21 extends in the substantially vertical direction, and the entire bottom surface of the second leg member 22 abuts on the mat 101*a*.

When the occupant pulls the further top plate 1 forward, as shown in FIG. 2C, the first leg member 21 is rotated upward about the shaft portion 32 as a fulcrum, the second leg member 22 is spaced from the floor 101, and the position of the top plate 1 is the third position. Since the top plate 1 is positioned in front of the seat cushion 201, the seat cushion 201 and the top plate 1 do not interfere from the second position to the third position.

Further, since the second leg member 22 is biased by the biasing member 3, as shown in FIG. 2D, the second leg member 22 rotates forward about the shaft portion 24 as a fulcrum, so that the distal end portion of the second leg member 22 (shaft portion 25) is spaced from the base end portion of the biasing member 3 (shaft portion 31). It rotates in the direction (forward). The rotation of the second leg member 22 with respect to the first leg member 21 in this case is limited by the stopper 33 provided in the vicinity of the shaft portion 24. At this time, the angle θ formed between the first leg member 21 and the second leg member 22 is maximum, and the position of the top plate 1 is the fourth position. Although not shown, the stopper 33 (a restriction portion) includes, for example, a convex portion provided at the first leg member 21 so as to project toward the second leg member 22 and a concave portion provided at the second leg member 22 corresponding to the convex portion, and is configured to operate by engagement of the convex portion and the concave portion.

Further, as shown in FIG. 2E, the leg member 2 while maximizing the angle θ formed between the first leg member 21 and the second leg member 22 is rotated upward about the shaft portion 23 as a fulcrum by the biasing force of the biasing member 3. In this state, the second leg member 22 rises substantially perpendicular to the floor 101, the position of the top plate 1 is the fifth position. In the fifth position, the lowermost third side surface 13 of the top plate 1 is positioned above the upper surface of the seat cushion 201.

Then, as shown in FIG. 2F, the occupant rotates the top plate 1 upward about the shaft portion 25 as a fulcrum by 90° (a second rotation angle). At this time, the top plate 1 is held in a state of projecting rearward by the rotation holding portion 26. Then, the occupant rotates the top plate 1 to the right via the support portion 15, and further deploys the top plate 1 to the right through the hinge. As a result, the top plate 1 is set at the use position above the seat cushion 201. The rotation angles of the top plate 1 with respect to the second leg member 22 held by the rotation holding portion 26 (first rotation angle, second rotation angle) are not limited to those described above.

Figure 4A:
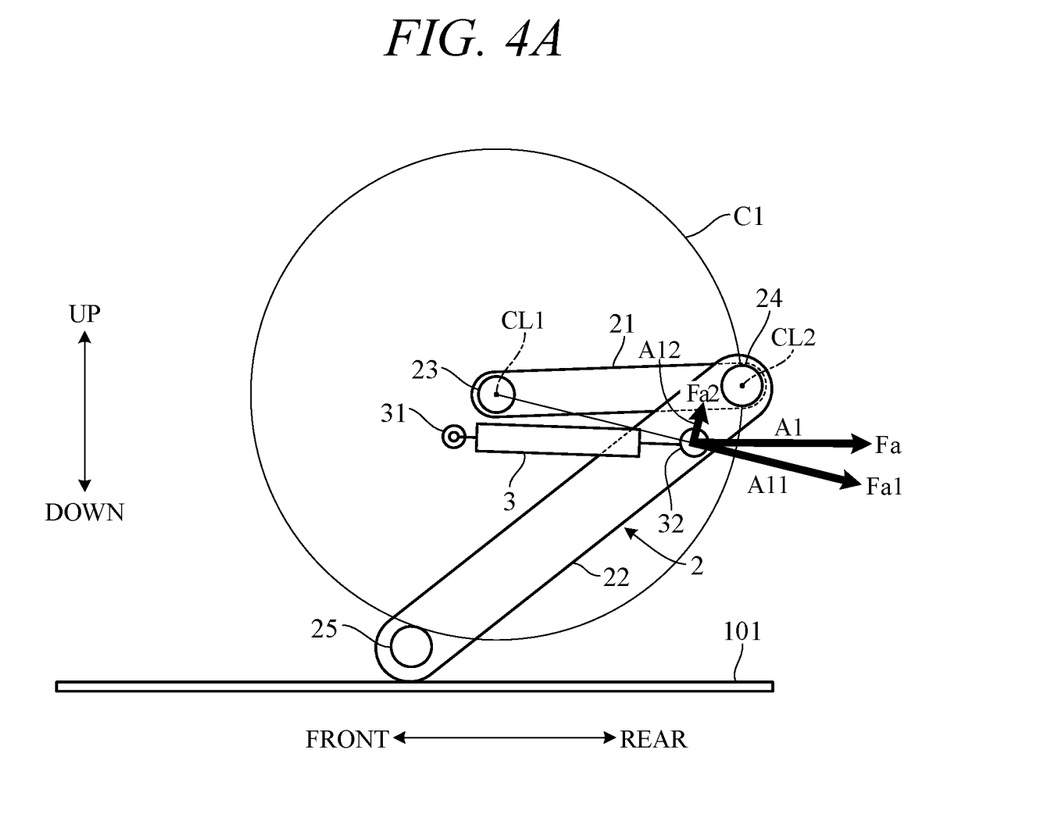
FIG. 4A is a diagram for explaining a biasing force applying on a leg member by a biasing member when the leg member of the table for seat according to the embodiment of the invention is in a retracted posture.
Figure 4B:
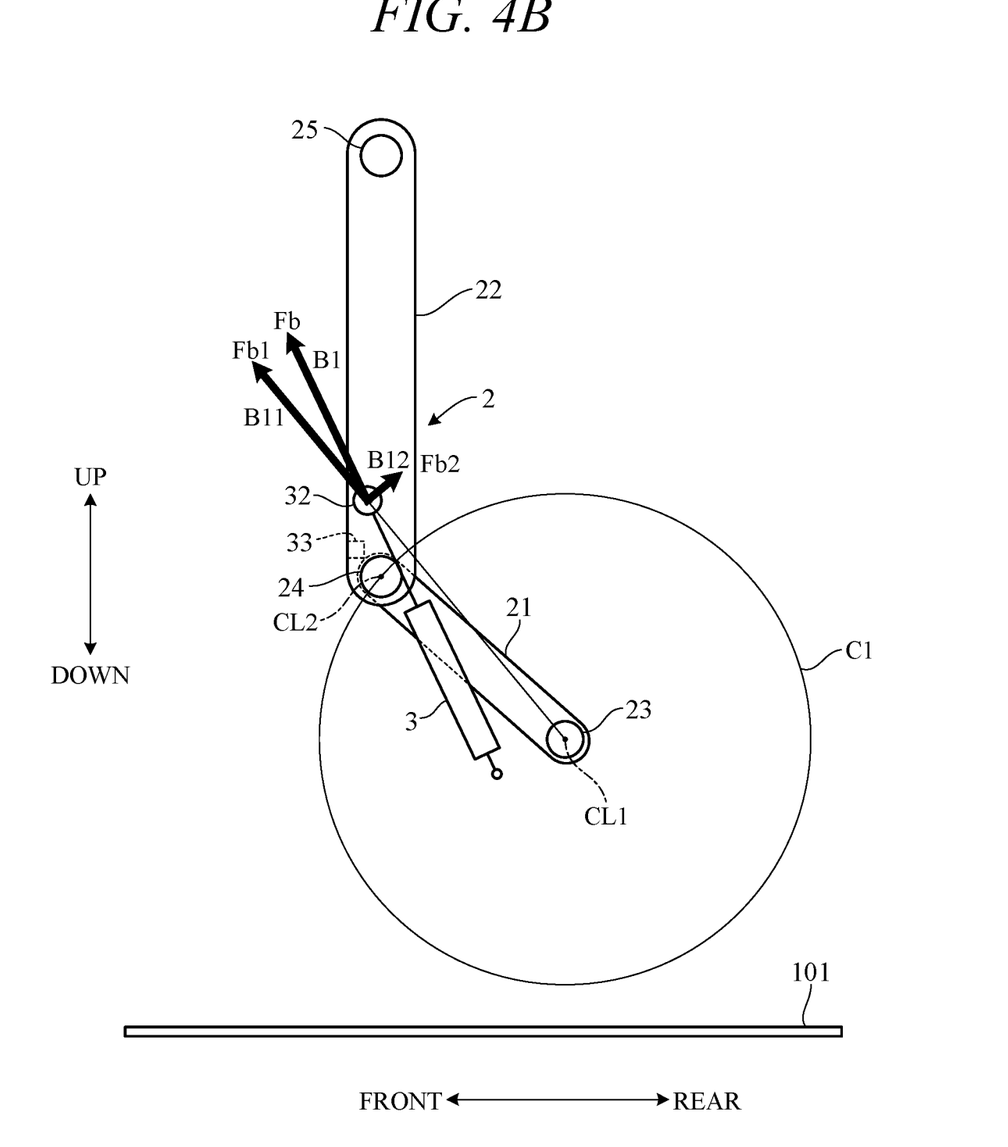
FIG. 4B is a diagram for explaining a biasing force applying on the leg member by the biasing member when the leg member of the table for seat according to the embodiment of the invention is in a vertical posture.

FIG. 4A and FIG. 4B are diagrams for explaining the biasing force applied to the leg member 2 by the biasing member 3, respectively. A circle Cl in the drawing shows a moving locus of the distal end portion of the first leg member 21 around the axial line CL1, i.e., the center of the shaft portion 24 (axial line CL2). In FIG. 4A and FIG. 4B, the illustration of the top plate 1 is omitted. FIG. 4A corresponds to the accommodation position of the top plate 1 in FIG. 1A and FIG. 2A. In this state, the leg member 2 is retracted below the seat cushion 201 and becomes a retracted posture. On the other hand, FIG. 4B corresponds to the use position in FIG. 1B and the position before reaching the use position of the top plate 1 in FIG. 2E and FIG. 2F. In this state, the leg member 2 rises beyond the seat cushion 201 and becomes a vertical posture.

As shown in FIG. 4A, when the leg member 2 is in the retracted posture, the biasing force Fa acts on the shaft portion 32 of the second leg member 22 in the direction of arrow A1 by the biasing member 3. The biasing force Fa can be decomposed into a component force Fa1 in the direction of arrow A11 connecting the shaft portion 23 and the shaft portion 32 and a component force Fa2 in the direction of arrow A12 perpendicular to the arrow A11. The component force Fa1 is a force pushing the second leg member 22 rearward, and the component force Fa2 is a force for rotating the leg member 2 upward about the shaft portion 23 as a fulcrum. Both component force Fa1 and Fa2 act in a direction to retract the leg member 2, thereby the leg member 2 together with the top plate 1, can be easily accommodated below the seat cushion 201. Although the component force Fa1 also acts in the direction of increasing the rotation angle of the second leg member 22 with respect to the first leg member 21 (the direction of rotating the second leg member 22 about the shaft portion 24 as a fulcrum rearward), the distal end portion of the second leg member 22 (shaft portion 25) is pressed against the floor 101 and the increase in the rotation angle is prevented.

As shown in FIG. 4B, when the leg member 2 is in the vertical posture, the biasing force Fb acts on the shaft portion 32 of the second leg member 22 in the direction of arrow B1 by the biasing member 3. The biasing force Fb can be decomposed into a component force Fb1 in the direction of arrow B11 connecting the shaft portion 23 and the shaft portion 24 and the component force Fb2 in the direction of arrow B12 perpendicular to the arrow B11. The component force Fb1 is a force for pushing the second leg member 22 upward, and the component force Fb2 is a force for rotating the leg member 2 upward about the shaft portion 23 as a fulcrum. Both component Fb1 and Fb2 act to raise the leg member 2, thereby the top plate 1 can be easily moved to the use position above the seat cushion 201. Although, the component force Fb1 also acts in the direction of increasing the rotation angle of the second leg member 22 with respect to the first leg member 21, increasing in the rotation angle is prevented by the stopper 33.

According to the present embodiment, following functions and effects can be exerted.

(1) A table for seat 100 is provided facing the seat 200 installed above the floor 101 of the vehicle (FIG. 1A, FIG. 1B). The table for seat 100 includes a top plate 1, and a leg member 2 attached to the bracket 102 provided below the seat 200 (seat cushion 201) (support portion 103) for movably supporting the top plate 1 from an accommodation position below the seat cushion 201 for supporting the hip of the occupant to a use position above the seat cushion 201 (FIG. 2A, FIG. 2F). The leg member 2 includes a first leg member 21 rotatably connected to the bracket 102 (support portion 103) and a second leg member 22 having one end rotatably connected to the first leg member 21 and the other end rotatably connected to the top plate 1. The table for seat 100 further includes a biasing member 3 disposed between the bracket 102 and the second leg member 22 to apply the biasing force to the second leg member 22 from the bracket 102 (FIG. 2F). Thus, in the embodiment, since the table for seat 100 is accommodated below the seat cushion 201 when not in use, it is possible to easily provide the table for seat 100 of sufficient size without miniaturizing the seat 200 in the width direction, and it is possible to suppress the restriction in the installation space of the seat 200.

(2) The biasing member 3 is provided so as to bias the second leg member 22 to a direction away from the bracket 102 (support portion 103) (FIG. 2F). As a result, the top plate 1 can be easily moved from the accommodation position to the use position by using the biasing force of the biasing member 3.

(3) The biasing member 3 is provided so as to bias the other end portion (shaft portion 25) of the second leg member 22 toward the floor 101 when the top plate 1 is positioned at the accommodation position (FIG. 2A). As a result, the top plate 1 can be easily moved to the accommodation position by using the biasing force of the biasing member 3. Further, it is possible to prevent generation of excessive vibration noise due to contact between the top plate 1 and the floor 101 by vibration during vehicle traveling.

(4) The biasing member 3 is provided so as to bias the other end portion of the second leg member 22 upward when the top plate 1 is moved to the use position (FIG. 2F). Thus, the posture of the leg member 2 can be easily changed to a vertical posture.

(5) The posture of the leg member 2 can be changed from the retracted posture when the top plate 1 is positioned at the accommodation position (FIG. 2A) to the vertical posture when the top plate 1 is positioned at the use position (FIG. 2F). The biasing member 3 is provided to apply the biasing force so that the leg member 2 becomes the retracted posture when the top plate 1 is moved below the seat cushion 201, and so that the leg member 2 becomes the vertical posture when the top plate 1 is moved above the seat cushion 201 (FIG. 4A, FIG. 4B). Thereby, the table for seat 100 can be biased to the accommodation position and the use position, respectively, by a simple configuration having a single biasing member 3, and the posture of the table for seat 100 can be easily changed.

(6) The biasing member 3 is connected to the bracket 102 and the second leg member 22, respectively (FIG. 2F). The bracket 102 has a support portion 103 to which the first leg member 21 is connected and a support portion 104 to which the biasing member 3 is connected separately. By configuring the first leg member 21 and the biasing member 3 so as to be connected to different portions in this manner, the direction in which the biasing force acts can be set to an optimal direction.

(7) The first leg member 21 is rotatably connected to the bracket 102 about an axial line CL1 extending in the width direction of the seat 200 (left-right direction), and the second leg member 22 is rotatably connected to the first leg member 21 about an axial line CL2 extending in the left-right direction (FIG. 2F). The top plate 1 is rotatably connected to the second leg member 22 about an axial line CL3 extending in the left-right direction, and rotatably provided about an axial line CL4 extending in a direction (front-rear direction) perpendicular to the left-right direction (FIG. 2F). As a result, the top plate 1 accommodated in a state of standing vertically below the seat cushion 201 can be brought into a horizontal posture above the seat cushion 201. A gap corresponding to the size of the top plate 1 can be easily formed between the floor 101 and the seat cushion 201. Therefore, it is possible to efficiently accommodate the top plate 1 when not in use.

Various modifications of the above embodiment are possible. Some examples are explained in the following. Although in the above embodiment, an air spring as the biasing member 3 is used, another elastic member such as a coil spring may be used as a biasing member. Although in the above embodiment, the first leg member 21 and the biasing member 3 are connected to the support portion 103 (first support portion) and the support portion 104 (second support portion) provided on the bracket 102 projecting upward from the upper surface of the floor 101, respectively, the configuration of a support portion is not limited to this. For example, a support portion may be provided in a frame of the seat 200.

In the above embodiment, the leg member 2 is configured by the substantially plate-shaped first leg member 21 (a first leg part) and second leg member 22 (a second leg part). However, a leg part may be configured by a rod-shaped or pipe-shaped member instead of the plate-shaped member. In the above embodiment, the top plate 1 is provided to the posture changeable from the retracted posture (a first posture) when the top plate 1 is positioned at the accommodation position to the vertical posture (a second posture) when the top plate 1 is positioned at the use position, but the first posture and the second posture are not limited to those described above. In the above embodiment, the first leg member 21 is rotatably provided about the axial line CL1 (a first axial line) extending in the left-right direction (a first direction) and the second leg member 22 is ratatably provided about the axial line CL2 (a second axial line) extending in the left-right direction. However, the first direction may be other than the left-right direction. In the above embodiment, the top plate 1 is rotatably provided about the axial line CL3 (a third axial line) extending in the left-right direction and is rotatably provided about the axial line CL4 (a fourth axial line) extending in the front-rear direction (a second direction) when the leg member 2 is in the vertical posture. However, the configuration of the support portion of the top plate 1 is not limited to those described above.

In the above embodiment, the table for seat 100 is placed at the center portion in the left-right direction of the seat 200 of the vehicle continuous to the left and right, the table for seat 100 is configured to develop in the left-right direction outward when the table is used. However, the left and right seats may be provided independently, and the table for seat 100 may be provided at each seat. In this case, the table for seat 100 may be disposed closer to one side in the left-right direction of each seat, and the top plate 1 may be positioned on the outside in the left-right direction of the seat in the middle of moving to the use position of the top plate 1 (e.g., the fifth position). Thus, when the top plate 1 is positioned at the fifth position (FIG. 2E), even if the third side surface 13 of the lowermost portion of the top plate 1 is positioned below the upper surface of the seat cushion 201, the top plate 1 can be prevented from interfering with the seat cushion 201.

In the above embodiment, the table for seat 100 is applied to the seat 200 of the rear of the vehicle, but it can also be applied to the seat of the front. The table for seat can be similarly applied to ones other than vehicles. Therefore, the configuration of the sitting portion for supporting the hip of the occupant is not limited to that described above.

The above embodiment can be combined as desired with one or more of the above modifications. The modifications can also be combined with one another.

According to the present invention, it is possible to provide a table for seat without increasing a restriction of an installation space of a seat.

Above, while the present invention has been described with reference to the preferred embodiments thereof, it will be understood, by those skilled in the art, that various changes and modifications may be made thereto without departing from the scope of the appended claims.

What is claimed is:

1. A vehicle comprising:
   a seat installed above a floor of the vehicle, and including a sitting portion;
   a support portion provided below the sitting portion; and
   a table provided facing the seat, wherein
   the table includes:
      a top plate;
      a leg part attached to the support portion to movably support the top plate from an accommodation position below the sitting portion to a use position above the sitting portion, the leg part including a first leg part rotatably connected to the support portion and a second leg part having a first end rotatably connected to the first leg part and a second end rotatably connected to the top plate; and
      a biasing member disposed between the support portion and the second leg part to apply a biasing force to the second leg part from the support portion, wherein
      the leg part movably supports the top plate so that after the top plate moves from the accommodation position below the sitting portion and behind a front end of the sitting portion to an intermediate position in front of the front end of the sitting portion, the top plate moves from the intermediate position to the use position above the sitting portion and behind the front end of the sitting portion.

2. The vehicle according to claim 1, wherein the biasing member is provided so as to bias the second leg part to a direction away from the support portion.

3. The vehicle according to claim 1, wherein the biasing member is provided so as to bias the second end of the second leg part toward the floor when the top plate is positioned at the accommodation position.

4. The vehicle according to claim 1, wherein the biasing member is provided so as to bias the second end of the second leg part upward when the top plate is moved at the use position.

5. The vehicle according to claim 4, wherein the table further includes a restriction portion configured to restrict a maximum rotation angle of the second leg part relative to the first leg part.

6. The vehicle according to claim 1, wherein the leg part is configured so that a posture of the leg part is changed from a first posture where the top plate is positioned at the accommodation position to a second posture where the top plate is positioned at the use position, and
the biasing member is configured to apply the biasing force so that the posture of the leg part is the first posture when the top plate is moved below the sitting portion, while the posture of the leg part is the second posture when the top plate is moved above the sitting portion.

7. The vehicle according to claim 1, wherein the biasing member includes a first end connected to the support portion and a second end connected to the second leg part,
the support portion includes a first support portion to which the first leg part is connected and a second support portion to which the biasing member is connected, and
the first support portion and the second support portion are separately provided.

8. The vehicle according to claim 7, wherein the biasing member is connected to a portion between the first end and the second end of the second leg part, and
the second support portion is disposed below the first support portion.

9. The vehicle according to claim 1, wherein the first leg part is rotatably connected to the support portion about a first axial line extending in a first direction, the first direction being a width direction of the seat,
the second leg part is rotatably connected to the first leg part about a second axial line extending in parallel with the first axial line,
the top plate includes a base portion and a plate portion,
the base portion is rotatably connected to the second leg part about a third axial line extending in parallel with the first axial line, and
the plate portion is rotatably connected to the base portion about a fourth axial line extending in a second direction perpendicular to the first direction.

10. The vehicle according to claim 9, wherein the table further includes a holding portion configured to hold a rotation angle of the top plate relative to the second leg part in a first rotation angle when the top plate is positioned in the accommodation position, and hold the rotation angle of the top plate relative to the second leg part in a second rotation angle greater than the first rotation angle when the top plate is positioned in the use position.

11. The vehicle according to claim 1, wherein the table further includes a shaft portion connecting rotatably the second leg part to an end portion of the first leg part, and the shaft portion is behind the front end of the sitting portion when the top plate is located at the accommodation position and is in front of the front end of the sitting portion when the top plate is located at the use position.

12. The vehicle according to claim 1, wherein
the support portion is configured by a bracket fixed on the floor, and includes a first support portion to which the first leg part is connected and a second support portion below the first support portion to which the biasing member is connected.

* * * * *